(12) United States Patent
Lee et al.

(10) Patent No.: US 8,526,749 B2
(45) Date of Patent: Sep. 3, 2013

(54) APPARATUS, METHOD, AND MEDIUM ENCODING/DECODING IMAGES THROUGH APPLICATION OF PSYCHO-VISUAL CHARACTERISTICS

(75) Inventors: Sang-jo Lee, Suwon-si (KR); Si-hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1111 days.

(21) Appl. No.: 12/155,540

(22) Filed: Jun. 5, 2008

(65) Prior Publication Data

US 2009/0092324 A1    Apr. 9, 2009

(30) Foreign Application Priority Data

Oct. 4, 2007 (KR) .................. 10-2007-0099969

(51) Int. Cl.
*G06K 9/46* (2006.01)

(52) U.S. Cl.
USPC .......................................................... 382/238

(58) Field of Classification Search
USPC .......................................................... 382/238
See application file for complete search history.

(56) References Cited

U.S. PATENT DOCUMENTS

| | | | |
|---|---|---|---|
| 5,307,426 A * | 4/1994 | Kanno et al. | 382/252 |
| 5,712,927 A * | 1/1998 | Kim et al. | 382/252 |
| 5,724,097 A | 3/1998 | Hibi et al. | |
| 6,295,379 B1 | 9/2001 | Goldstein et al. | |
| 6,535,555 B1 | 3/2003 | Bordes et al. | |
| 6,977,757 B1 * | 12/2005 | Takahashi et al. | 358/3.05 |
| 7,454,050 B2 * | 11/2008 | Garvey | 382/141 |
| 7,702,169 B2 * | 4/2010 | Hung et al. | 382/236 |
| 7,847,251 B1 * | 12/2010 | Praly | 250/330 |
| 2001/0028749 A1 * | 10/2001 | Kimura | 382/240 |
| 2002/0191855 A1 | 12/2002 | Matsuura et al. | |
| 2004/0146106 A1 * | 7/2004 | De Lameillieure | 375/240.12 |
| 2005/0063596 A1 * | 3/2005 | Yomdin et al. | 382/232 |
| 2005/0063599 A1 * | 3/2005 | Sato | 382/232 |
| 2005/0117805 A1 * | 6/2005 | Poutet et al. | 382/232 |
| 2006/0171596 A1 * | 8/2006 | Sung et al. | 382/232 |
| 2007/0009163 A1 | 1/2007 | Sasaki et al. | |
| 2007/0110327 A1 | 5/2007 | Han | |
| 2009/0196519 A1 * | 8/2009 | Bailey et al. | 382/252 |

FOREIGN PATENT DOCUMENTS

| | | |
|---|---|---|
| JP | 07-115664 | 5/1995 |
| JP | 2006-222861 | 8/2006 |
| KE | 10-2009-0014602 | 2/2009 |
| KR | 10-2001-0012071 | 2/2001 |
| KR | 10-2006-0092825 | 8/2006 |
| KR | 10-2006-0093741 | 8/2006 |

OTHER PUBLICATIONS

Ted Painter et al., "Perceptual Coding of Digital Audio", Proceedings of the IEEE, vol. 88, No. 4, Apr. 2000, pp. 451-513.

(Continued)

*Primary Examiner* — Jingge Wu
(74) *Attorney, Agent, or Firm* — Staas & Halsey LLP

(57) ABSTRACT

A method, medium, and apparatus encoding and/or decoding an image according to human psycho-visual characteristics. According to a method, medium, and apparatus, error values corresponding to a range in which error values can be recognized because of the human psycho-visual characteristic are selectively encoded.

13 Claims, 9 Drawing Sheets

(56) References Cited

OTHER PUBLICATIONS

Information Technology, "Generic Coding of Moving Pictures and Associated Audio", International Organisation for Standardisation Organisation Internationale De Normalisation, ISO/IEC JTC1/SC29/WG11, Coding of moving Pictures and Associated Audio, ISO/IEC JTC1/SC29/WG11N0702rev, Incorporating N702 Delta Mar. 24, Mar. 25, 1994.

"ISO/IEC 13818-2-1995 (E)" 1995.

"Two low cost algorithms for improved diagonal edge detection in JPEG-LS", IEEE Trans. on Consumer Electronics, vol. 47, No. 3, Aug. 1, 2001, pp. 466-473.

European Examination Report issued Dec. 22, 2010, corresponds to European Patent Application No. 08 161 057.8-2223.

Xiankang Yang et al, Motion-Compensated Residue Preprocessing in Video Based on Just-Noticeable-Distortion Profile, IEEE Trans. on Circuits and Systems for Video Technology, Jun. 2005, vol. 15, No. 6, pp. 742-752.

C. Grecos, J. jiang et al., Two Low Cost Algorithms for Improved Diagonal Edge Detection in JPEG-LS, IEEE Trans. on Consumer Electronics, Aug. 2001, vol. 47, No. 3, pp. 466-473.

Japanese Office Action issued September corresponds to Japanese Patent Application No. 2008-260172.

"Two low cost algorithms for improved diagonal edge detection in JPEG-LS", IEEE Trans. on Consumer Electronics, vol. 47, Nov. 3, 2001, pp. 466-476.

* cited by examiner

| PIXEL | 1 | 2 | 3 | 4 | 5 | 6 | 7 | 8 | 9 | 10 |
|---|---|---|---|---|---|---|---|---|---|---|
| EDGE | 0 | -13 | 26 | 25 | 3 | -92 | 1 | 0 | 0 | 5 |
| ERROR VALUES OF ADJACENT PIXELS | 0 | 29 | 59 | 46 | 6 | 111 | 4 | 5 | 0 | 2 |

FIG. 9B
| PIXEL | 1 | 2 | 3 | 4 | 5 | 6 | 7 | 8 | 9 | 10 |
|---|---|---|---|---|---|---|---|---|---|---|
| HIGH-ORDER BIT | 0 | 0 | 0 | 0 | 0 | 0 | 0 | 0 | 0 | 0 |
| | 0 | 0 | 0 | 0 | 0 | 1 | 0 | 0 | 0 | 0 |
| | 0 | 0 | 0 | 0 | 0 | 0 | 0 | 0 | 0 | 0 |
| | 0 | 0 | 1 | 1 | 0 | 1 | 0 | 0 | 0 | 0 |
| | 0 | 1 | 1 | 1 | 0 | 1 | 0 | 0 | 0 | 0 |
| | 0 | 1 | 0 | 0 | 0 | 1 | 0 | 0 | 0 | 1 |
| | 0 | 0 | 1 | 0 | 1 | 0 | 0 | 0 | 0 | 0 |
| LOW-ORDER BIT | 0 | 1 | 0 | 1 | 1 | 0 | 1 | 0 | 0 | 1 |
FIG. 10
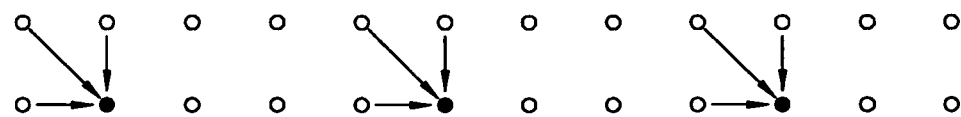
FIG. 11
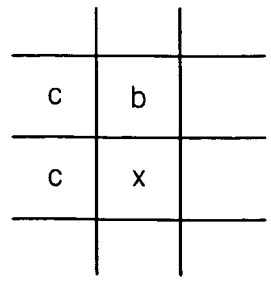

APPARATUS, METHOD, AND MEDIUM ENCODING/DECODING IMAGES THROUGH APPLICATION OF PSYCHO-VISUAL CHARACTERISTICS

CROSS-REFERENCE TO RELATED APPLICATIONS

This application claims the benefit of Korean Patent Application No. 10-2007-0099969, filed on Oct. 4, 2007, in the Korean Intellectual Property Office, the disclosure of which is incorporated herein in its entirety by reference.

BACKGROUND

1. Field

One or more embodiments of the present invention relate to a method, medium, and apparatus encoding and/or decoding an image, and more particularly, to a method, medium, and apparatus encoding and/or decoding an image by considering human psycho-visual characteristics.

2. Description of the Related Art

In audio coding, an example psycho-acoustic model based on a human acoustic characteristic may be applied during an encoding operation to set a masking threshold such that a different number of bits are assigned to each frequency region.

Similarly, there are image coding technologies that are based on human psycho-visual characteristic. Examples of such coding technologies include using a particular format weighting of luminance and chrominance information, such as a YUV format, and using a quantization matrix in a discrete cosine transform (DCT) applied to the information to separate and code the information according frequency components. In these examples, the YUV format may compress data by assigning less bits to chrominance information than luminance information based on the characteristic that human eyesight is not as sensitive to changes in chromaticity. DCT divides the information into frequency ranges, e.g., a low frequency range and a high frequency range, and reduces the number of bits assigned to quantizing the high frequency regions compared to quantizing the low frequency regions based on the human psycho-visual characteristic of human eyesight's increased insensitivity to high frequency ranges.

SUMMARY

One or more embodiments of the present invention provide a method, medium, and apparatus encoding and/or decoding minimized visual ranges according to human psycho-visual characteristics.

Additional aspects and/or advantages will be set forth in part in the description which follows and, in part, will be apparent from the description, or may be learned by practice of the invention.

To achieve the above and/or other aspects and advantages embodiments of the present invention include a method of encoding an image based on psycho-visual characteristics, the method including calculating an error between a value of a predetermined pixel, of a plurality of pixels forming an image, and a reference pixel corresponding to the predetermined pixel, determining a range of the calculated error to be encoded according to a preset operation determining the range, the preset operation determining the range based on a psycho-visual characteristic based recognition of portions of the calculated error selected to be excluded during encoding, and encoding the calculated error using only the determined range.

To achieve the above and/or other aspects and advantages embodiments of the present invention include a method of encoding an image, the method including selectively encoding one of all bits of a calculated error and a select sequential range of bits of the calculated error, with the select sequential range being at least one bit and less than all bits of the calculated error and the calculated error being an error between a current pixel and a projected pixel corresponding to the pixel for an image.

To achieve the above and/or other aspects and advantages embodiments of the present invention include a method of decoding an image encoded based on psycho-visual characteristics, the encoded image including encoded calculated error between a value of a predetermined pixel, of a plurality of pixels forming the image, and a reference pixel corresponding to the predetermined pixel, with the encoded calculated error including a select range of an unencoded calculated error calculated by an encoder that generated the encoded calculated error, and with the range of the encoded calculated error being based on a psycho-visual characteristic based recognition of portions of the unencoded calculated error excluded during encoding, the decoding method including receiving the encoded calculated error, and restoring a value corresponding to the unencoded calculated error by synthesizing a remainder of the encoded calculated error and combining the synthesized remainder with the received encoded calculated error.

To achieve the above and/or other aspects and advantages embodiments of the present invention include an apparatus encoding an image based on psycho-visual characteristics, the apparatus including an error calculation unit to calculate an error between a value of a predetermined pixel, of a plurality of pixels forming an image, and a reference pixel corresponding to the predetermined pixel, an encoding range determination unit to determine a range of the calculated error to be encoded according to a preset operation determining the range, the preset operation determining the range based on a psycho-visual characteristic based recognition of portions of the calculated error selected to be excluded during encoding, and an encoding unit to encode the calculated error using only the determined range.

To achieve the above and/or other aspects and advantages embodiments of the present invention include an apparatus selectively encoding one of all bits of a calculated error and a select sequential range of bits of the calculated error, with the select sequential range being at least one bit and less than all bits of the calculated error and the calculated error being an error between a current pixel and a projected pixel corresponding to the pixel for an image.

BRIEF DESCRIPTION OF THE DRAWINGS

These and/or other aspects and advantages will become apparent and more readily appreciated from the following description of the embodiments, taken in conjunction with the accompanying drawings of which:

FIG. 9B is a table illustrating errors of first through tenth pixels in units of bit-planes in an order from high bits to low bits, according to an embodiment of the present invention;

FIG. 10 is a diagram illustrating prediction of a value of a predetermined pixel when a value of a reference pixel corresponding to an n-th pixel is predicted, according to an embodiment of the present invention;

FIG. 11 is a diagram illustrating a prediction of a value of a predetermined pixel 'x', according to an embodiment of the present invention;

DETAILED DESCRIPTION OF THE EMBODIMENTS

Figure 1:
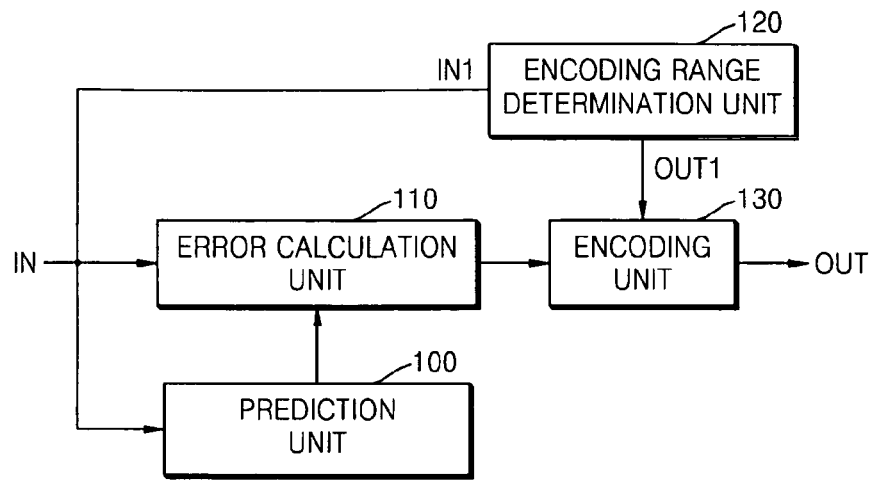
FIG. 1 illustrates an apparatus encoding an image by using a psycho-visual characteristic, according to an embodiment of the present invention.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an apparatus encoding an image by using a psycho-visual characteristic, according to an embodiment of the present invention. Herein, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could be a single processing element or implemented through a distributed network, noting that additional and alternative embodiments are equally available.

Such an apparatus encoding an image according to psycho-visual characteristics may include a prediction unit 100, an error calculation unit 110, an encoding range determination unit 120, and an encoding unit 130, for example.

The prediction unit 100 may receive an input of pixels forming an image from an input terminal (IN), and predict the value of a respective reference pixel corresponding to each pixel according to a preset method. For example, FIG. 10 illustrates a prediction of a value of a predetermined pixel in a prediction unit, such as prediction unit 100, according to an embodiment of the present invention. Referring to FIG. 10, the value of a predetermined pixel can be predicted by using the values of pixels disposed above, to the left of, and to the right of the predetermined pixel. In an embodiment, an edge detecting operation may be used to predict such a value in the prediction unit 100. As an example, the edge detecting operation may be that discussed in "Two low cost algorithms for improved diagonal edge detection in JPEG-LS", IEEE Trans. On Consumer Electronics, Vol. 47, No. 3, 2001, pp 466-476, noting that alternatives are equally available.

An embodiment of predicting the value of a predetermined pixel 'x' by using an edge detecting method will now be further explained with reference to FIG. 11. An algorithm of an edge detecting operation for the pixel 'x' may be as follows:

```
if (c >= max(a,b)) P = min(a,b);
else{
    if (c <= min(a,b)) P = max(a,b);
    else P = a+b−c;
}
```

Here, 'P' is the value of the reference pixel corresponding to the pixel 'x', 'a' is the value of the pixel disposed to the left of the pixel 'x', 'b' is the value of the pixel above the pixel 'x', and 'c' is the value of the pixel above and to the left of the pixel 'x'.

According to this example algorithm, the value of the reference pixel 'P' is determined according to whether an edge is in the horizontal direction or in the vertical direction, and which is the greater of 'a' and 'b'. Here, for example, if it is assumed that the greater value of 'a' and 'b' is equal to or greater than 'c', when the smaller value of 'a' and 'b' is 'a', the pixel 'x' may be considered to have an edge in the horizontal direction, and the value 'P' of the reference pixel may be determined to be 'a'. In this case, when the smaller value of 'a' and 'b' is 'b', the pixel 'x' can be considered as having an edge in the vertical direction, and the value 'P' of the reference pixel may be determined to be 'b'. Meanwhile, if it is assumed that the smaller value of 'a' and 'b' is equal to or greater than 'c', when the greater value of 'a' and 'b' is 'a', the pixel 'x' may be considered to have an edge in the horizontal direction, and the value 'P' of the reference pixel may be determined to be 'a'. In this case, when the greater value of 'a' and 'b' is 'b', the pixel 'x' may be considered to have an edge in the vertical direction, and the value 'P' of the reference pixel may be determined to be 'b'. Still further, if it is assumed that 'c' is greater than the smaller value of 'a' and 'b', and smaller than the greater value of 'a' and 'b', it may be difficult to determine the direction of an edge, and the value 'P' of the reference pixel may, thus, be determined to be a value obtained by adding 'a' and 'b' and then, subtracting 'c' from the addition result, by considering all 'a', 'b', and 'c', noting that alternative embodiments are equally available.

Referring to FIG. 1, the error calculation unit 110 may calculate an error between the predicted value of a reference pixel, which is predicted corresponding to each input pixel input from the input terminal IN, and a known actual value of the input pixel, for example.

The encoding range determination unit 120 may determine an ultimate range of the calculated error to actually be encoded, rather than the full calculated error, for example. The determination in the encoding range determination unit 120 can be accomplished by a preset method capable of determining an encoding range that would be recognized based on human psycho-visual characteristics. The recognition aspect is based upon whether one would recognize a change in the ultimate encoded value from a full encoded value, or whether the change in the encoded value is small enough to not be recognized. In other words, the encoding range determination unit 120 may distinguish the error calculated in the error calculation unit 110 representing values corresponding to high order bits that would be recognized according to human psycho-visual characteristics from values corresponding to low order bits that would not be recognized according to psycho-visual characteristics.

Below, embodiments of the encoding range determination unit 120 will be further discussed with reference to FIGS. 2, 3, and 4, as only examples.

Figure 2:
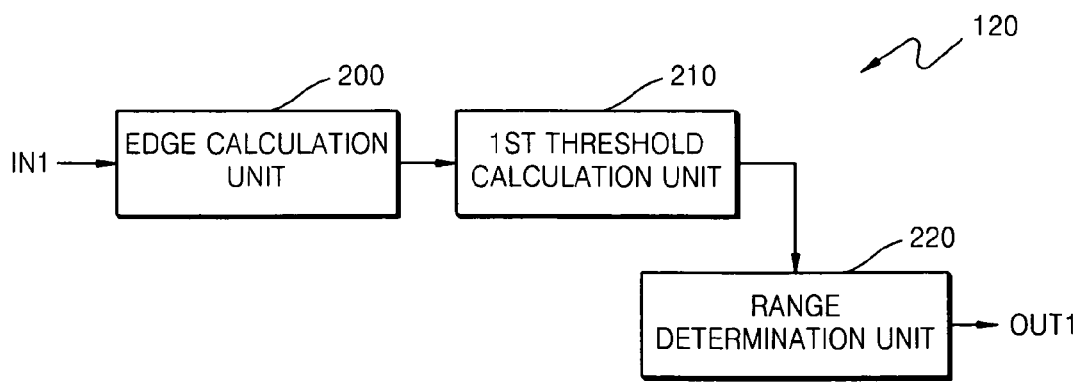
FIG. 2 illustrates an encoding range determination unit to determine a range to be encoded of an error calculated in an error calculation unit, according to an embodiment of the present invention.

FIG. 2 illustrates an encoding range determination unit to determine a range to be encoded of an error calculated in an error calculation unit, such as the error calculation unit 110 illustrated in FIG. 1, according to an embodiment of the present invention. The encoding range determination unit 120 may include an edge calculation unit 200, a first threshold calculation unit 210, and a range determination unit 220, for example.

Figure 7:
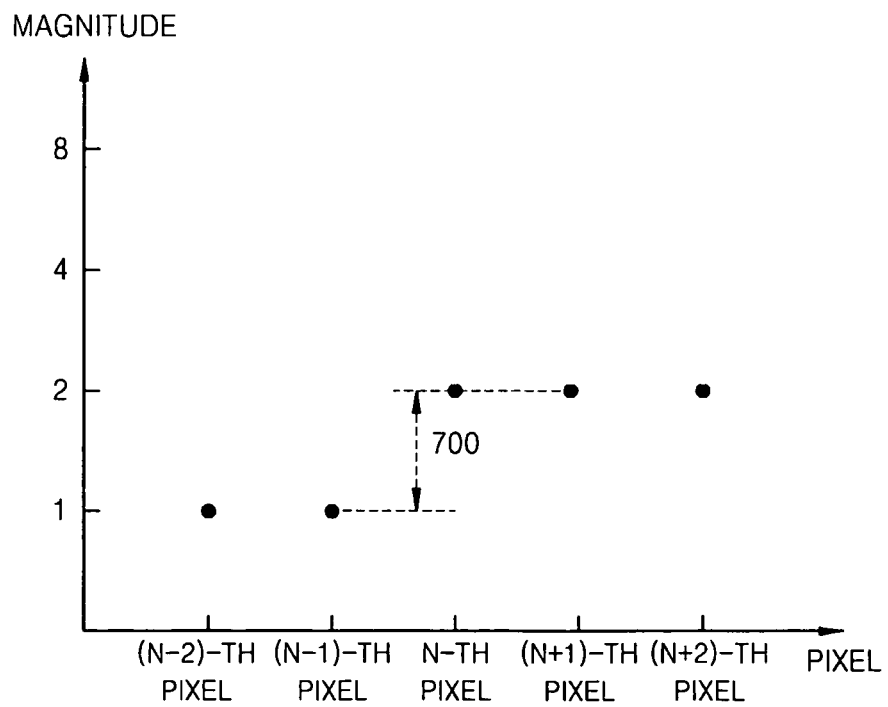
FIG. 7 is a graph illustrating an edge of an n-th pixel, according to an embodiment of the present invention.

The edge calculation unit 200 may calculate an edge of each pixel. Herein, an edge means a difference value between the value of a predetermined pixel and the value of an adjacent pixel disposed adjacent to the predetermined pixel. Referring to FIG. 7, for example, an edge of an n-th pixel is the difference value between an (n−1)-th pixel and the n-th pixel, and corresponds to an interval indicated by a reference number 700.

The first threshold calculation unit 210 may calculate a first threshold by dividing an edge of each pixel calculated in the edge calculation unit 200 by a preset first value.

The range determination unit 220 may further determine a range to be encoded of an error calculated in the error calculation unit 110, for example, by using the first threshold calculated in the first threshold calculation unit 210. Two example embodiments in which the range determination unit 220 determines a range to be encoded in an error by using the first threshold will now be explained.

Figure 5A:
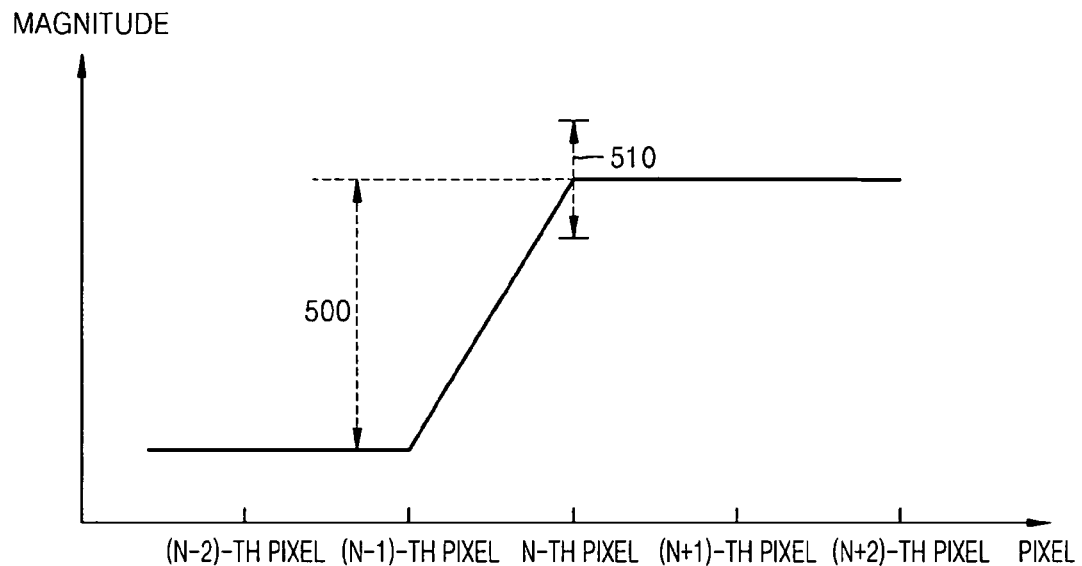
FIG. 5A is a graph illustrating a range of error of an n-th pixel calculated by using an edge of the n-th pixel, according to an embodiment of the present invention.
Figure 6:
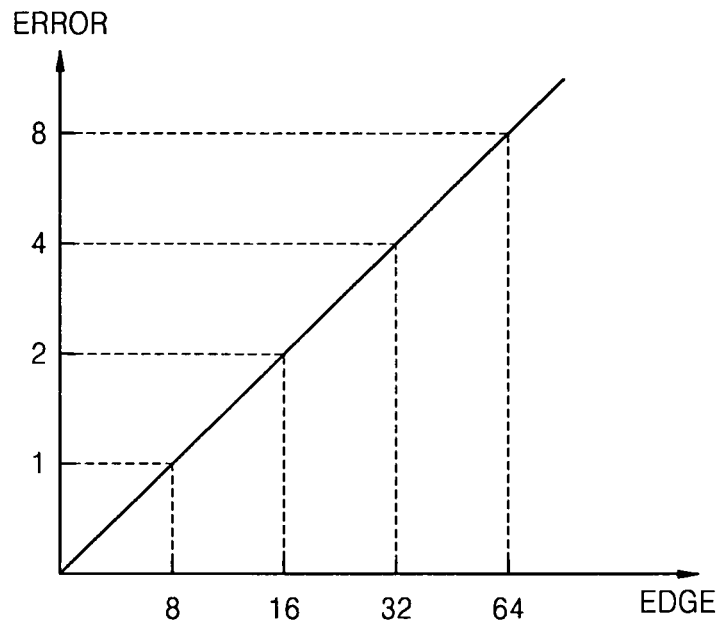
FIG. 6 is a graph illustrating a relationship between an edge and an error with a threshold that is a gradient, according to an embodiment of the present invention.

First, in this example, values of an error which are calculated in the error calculation unit 110 and which are not included in the first threshold may be set to be included in a range to be encoded. Referring to FIG. 5A, for example, the edge calculation unit 200 may calculate an interval corresponding to a reference number 500 as an edge of an n-th pixel, and if '8' is preset as a value for division for a first threshold, as in a graph illustrated in FIG. 6, the first threshold calculation unit 210 may divide the interval corresponding to the reference number 500 by '8'; thereby calculating the first threshold. The range determination unit 220 may then identify the range corresponding to the reference number 510, permitting errors corresponding to the first threshold in relation to the n-th pixel value.

An example of the fourth pixel illustrated in FIG. 9A will now be explained, assuming that an edge for the fourth pixel is calculated as '25' in the edge calculation unit 200. However, since adjacent pixels are generally used in the prediction unit 100 in order to predict a reference pixel, it will be assumed in the embodiments illustrated in FIGS. 9A and 9B that an edge is the same as an error. In the first threshold calculation unit 210, '25', the edge of the fourth pixel, is divided by '8', the preset first value, thereby obtaining a first threshold of '3.125'. The range determination unit 220 may then identify the range not to be encoded to be the 2 low order bits corresponding to a value equal to or less than the first threshold of '3.125', and the range to be encoded to be the 3 high order bits corresponding to a value equal to or greater than the first threshold of '3.125'. According to this, the range determination unit 220 may set only the 3 high order bits '110' from the entire '11001' (corresponding to '25' which is the error of the fourth pixel) to be the range to be encoded, with the 2 low order bits '01' being the range of the entire '11001' not encoded.

Secondly, the range to be encoded may be determined by considering the range of the calculated error and not included in a first threshold range, and an algorithm for restoring bits of error values in a decoder, where some bit error values are not encoded in an encoder. Thus, in an embodiment, the error values not encoded in the encoder may be restored by a corresponding algorithm preset in the decoder. In this case, as an example of the preset algorithm, expected values, mean values, and median values of all possible values in the range of error values not encoded in the encoder can be restored in such a decoder, and a value to be restored corresponding to each error value may be stored in a table in advance, for example, and read from the table during decoding, thereby enabling restoration by the decoder. In an embodiment, if such restoration in the decoder is performed by using median values of all possible numbers in the range of errors that are not encoded in the encoder, the number of low order bits not to be encoded, which is determined by a first threshold, may be further increased by 1 bit, and therefore the number of high order bits to be encoded, which is determined by the first threshold, may actually be decreased by 1 bit.

Figures 8, 9A:
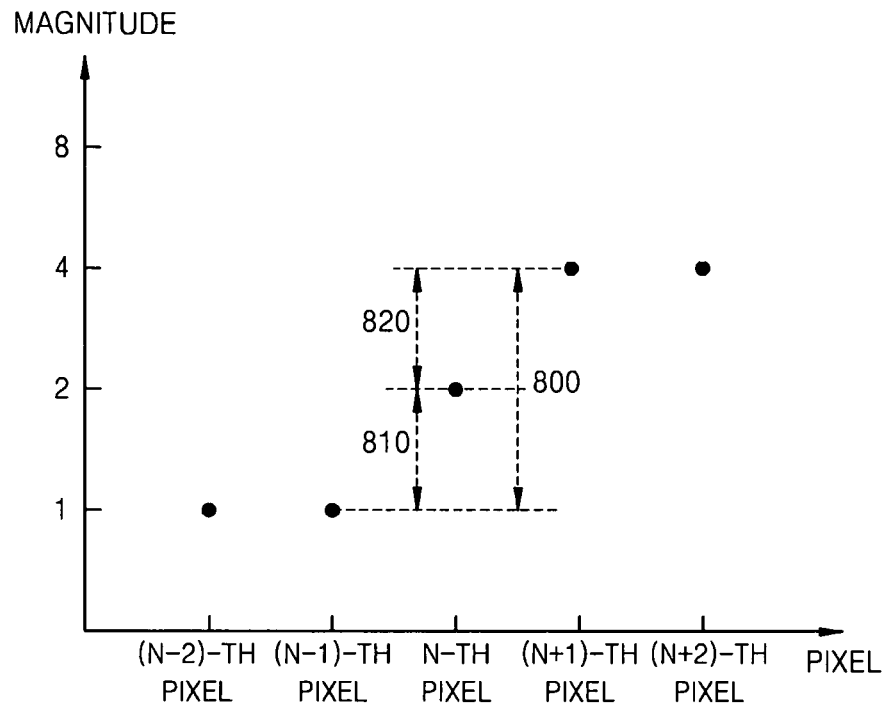
FIG. 8 is a graph illustrating a difference value of adjacent pixels of an n-th pixel, according to an embodiment of the present invention.
FIG. 9A is a table illustrating edges of first through tenth pixels and difference values of adjacent pixels of the first through tenth pixels, according to an embodiment of the present invention.

For example, in the case of the fourth pixel illustrated in FIG. 9A, which is the example explained in the first method, with reference to the first threshold of '3.125', the range determination unit 220 may identify a range not to be encoded to be the 2 low order bits corresponding to a value equal to or less than the first threshold of '3.125', and a range to be encoded to be the 3 high order bits corresponding to a value equal to or greater than the first threshold of '3.125'. Accordingly, the range determination unit 220 may set only the 3 high order bits '110' from the entire '11001' (corresponding to '25' which is the error of the fourth pixel) to be the range to be encoded, and the 2 low order bits '01' of the entire '11001' to be the range not to be encoded.

However, in an embodiment, if restoration in a decoder is performed according to this second example method by using median values of all possible numbers in the range of errors that are not encoded in such an encoder, only the '11', which is the 2 high order bits, may have been the encoded range, without further encoding the 1 bit of the high order bits, thus with the 3 low order bits not having been encoded. Also in this case, the decoder may restore the 3 low order bits as '100', which is the median value of '000' through '111' that can be expressed by the 3 low order bits that are not transmitted by the encoder. These 3 restored low order bits may then be synthesized with '11', which is the 2 high order bits transmitted by the encoding end, and '11100' finally restored. Here, in this example, the restored '11100' would differ by only '11' in comparison to '11001' which is the error of the fourth pixel, and therefore would be within the first threshold range. Accordingly, although a range encoding 1 bit less may be determined from among the high order bits determined according to the first threshold, a value of a pixel corresponding to within the threshold range can be restored in the decoder, with the result still not being recognized according to human psycho-visual characteristics, i.e., though less bits are actually encoded the difference between the restored value and a fully encoded value is low enough to be unrecognizable.

In a similar manner, by calculating the first thresholds with edges for the first through third pixels and the fifth through tenth pixels illustrated in FIG. 9A, for example, the bits above the dotted lines illustrated in FIG. 9B may be set as the ranges to be encoded and ultimately decoded by a decoder embodiment. Since the example, embodiments illustrated in FIGS. 9A and 9B assume that the preset first value is '8', only the 2 high order bits have been determined as a range to be encoded, noting that alternatives are also available.

In other words, for example, if it is assumed that an edge of a predetermined pixel is the same as an error of a reference pixel and a preset value for division for a first threshold is '8', the aforementioned first method would set only the 3 high order bits of the calculated error as a range to be encoded, and according to the aforementioned second method, if an algorithm by which a median value for low order bits not encoded in an encoder is added when restoration in a decoder is performed, is employed, only the 2 high order bits of the calculated error are needed to be set as the range to be encoded. However, as noted, the preset value is not limited to '8' and according to an execution environment such as the characteristic of a display, for example, a different value can also be preset and executed.

Figure 3:
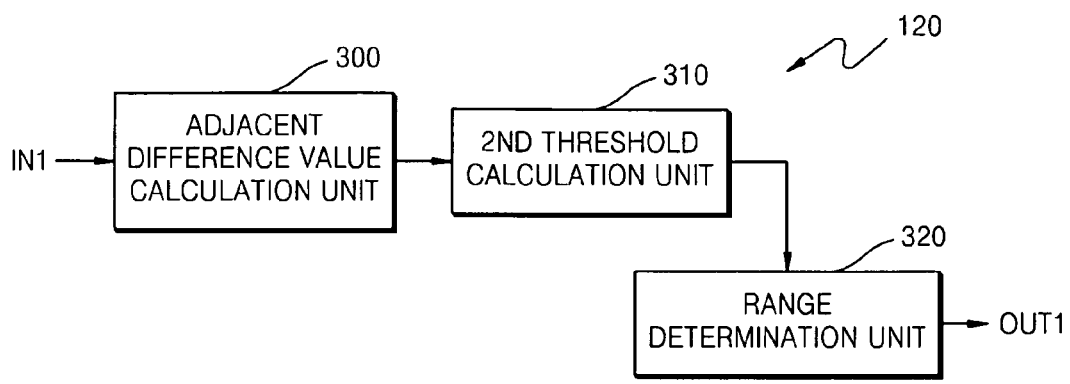
FIG. 3 illustrates an encoding range determination unit to determine a range to be encoded of an error calculated in an error calculation unit by using adjacent pixels disposed adjacent to a predetermined pixel, according to an embodiment of the present invention.

FIG. 3 illustrates an encoding range determination unit to determine a range to be encoded of an error calculated in an error calculation unit, such as the error calculation unit 110, by using adjacent pixels disposed adjacent to a predetermined pixel, according to an embodiment of the present invention. The encoding range determination unit 120 may include an adjacent difference value calculation unit 300, a second threshold calculation unit 310, and a range determination unit 320, for example.

The adjacent difference value calculation unit 300 may calculate a difference value between adjacent pixels disposed adjacent to each pixel. Referring to FIG. 8, for example, the difference value between the adjacent pixels of an n-th pixel means the difference value between an (n−1)-th pixel and an (n+1)-th pixel disposed adjacent to the n-th pixel, and corresponds to the interval indicated by a reference number 800.

The second threshold calculation unit 310 may, thus, calculate a second threshold, by dividing the difference value between adjacent pixels of each pixel calculated in the adjacent difference value calculation unit 300 by a preset second value.

In this case, the preset second value may be different from the present first value described above with reference to FIG. 2. The difference value between adjacent pixels disposed adjacent to a predetermined pixel corresponds to a value equal to or greater than a value obtained by multiplying a maximum difference value between the predetermined pixel and an adjacent pixel by '2', for example. Such a relationship will now be explained with further reference to FIG. 8. In this example, adjacent pixels to the n-th pixel include the (n−1)-th pixel and the (n+1)-th pixel. A first edge, which is the difference value between the n-th pixel and the (n−1)-th pixel, as one of adjacent pixels of the n-th pixel, is a value corresponding to a reference number 810. A second edge, which is the difference value between the n-th pixel and the (n+1)-th pixel, as one of the other adjacent pixels of the n-th pixel, is a value corresponding to a reference number 820. This relationship may be expressed by the below Equation 1, for example.

$$\max(\text{edge1}, \text{edge2}) \geq \text{neighbor}/2 \qquad \text{Equation 1:}$$

Here, "edge1" is the first edge and "edge2" is the second edge, and "neighbor" is the difference value between adjacent pixels.

Since edges and the difference value between adjacent pixels may have such a relationship as shown in Equation 1, in this embodiment it will be assumed that an edge is the same as the difference value between adjacent pixels, and a value obtained by dividing a first value by '2' can be preset as a second value, for example.

The range determination unit 320 may determine a range to be encoded of a calculated error, such as by the error calculation unit 110, by using the second threshold calculated in the second threshold calculation unit 310. Two example embodiments in which the range determination unit 320 determines a range to be encoded in the error by using the second threshold will now be explained.

Figure 5B:
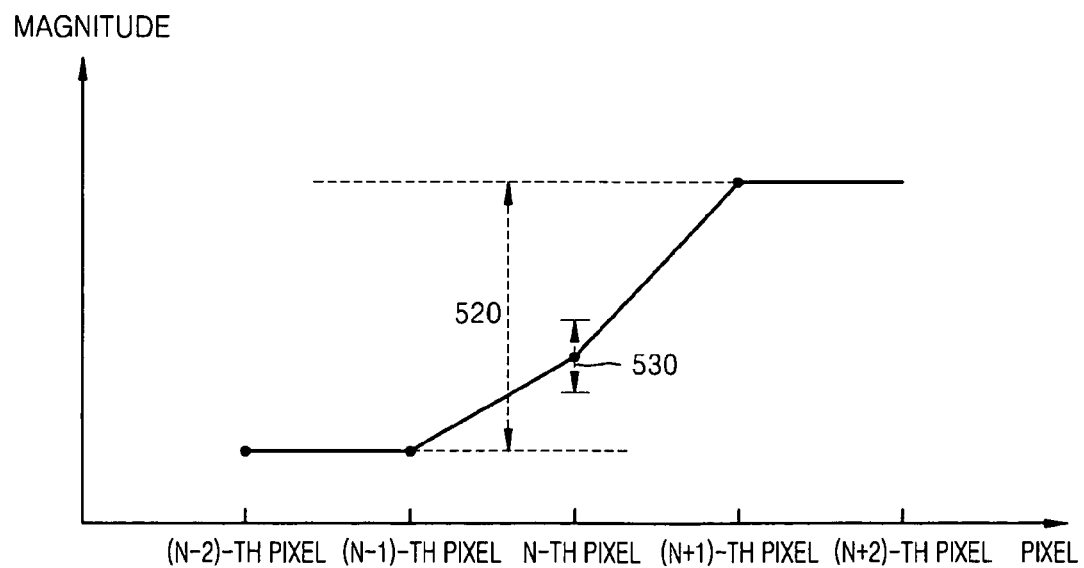
FIG. 5B is a graph illustrating a range of error of an n-th pixel calculated by using a difference value of adjacent pixels of the n-th pixel, according to an embodiment of the present invention.

First, values of a calculated error, such as calculated in the error calculation unit 110, and which do not fall within the second threshold are determined to be included in a range to be encoded. Referring to FIG. 5B, for example, the adjacent difference value calculation unit 300 may calculate an interval indicated by a reference number 520, which is the difference value between an (n−1)-th pixel and an (n+1)-th pixel adjacent to an n-th pixel. If '16' is preset as the second value for division for the second threshold, the second threshold calculation unit 310 may set the second threshold by dividing the interval corresponding to the reference number 520 by '16'. The range determination unit 320 may thus permit errors that fall outside the second threshold range relative to the value of the n-th pixel to be encoded.

According to an embodiment, an example of the fourth pixel illustrated in FIG. 9A will now be explained, assuming that the difference value between adjacent pixels of the fourth pixel is calculated as '46' in the adjacent value calculation unit 300, for example. Here, since adjacent pixels are generally used in such a prediction unit 100 in order to predict a reference pixel, it may be assumed in the embodiments illustrated in FIGS. 9A and 9B that an edge is the same as an error. In the second threshold calculation unit 310, '45', the difference value of adjacent pixels of the fourth pixel, may thus be divided by '16', thereby obtaining a second threshold of '2.875'. The range determination unit 320 may then set a range of the calculated error not to be encoded to be the 2 low order bits corresponding to a value equal to or less than the second threshold of '2.875', and a range of the calculated error to be encoded to be the 3 high order bits corresponding to a value equal to or greater than the second threshold of '2.875'. According to this, the range determination unit 320 may set only the 3 high order bits '110' from the entire '11001' (corresponding to '25' which is the error of the fourth pixel) to be the range to be encoded, and the 2 low order bits '01' of the entire '11001' to be the range not to be encoded.

Secondly, in an embodiment, the range to be encoded may be determined by considering the range of a calculated error, such as calculated in the error calculation unit 110, and not falling within the second threshold range, and an algorithm for restoring such non-encoded error values in a decoder. In this embodiment, the error values not encoded by such an encoder may, thus, be restored by an algorithm preset in the decoder. In this case, as an example of the preset algorithm, expected values, mean values, and median values of all possible values in the range of error values not encoded in the encoder may be restored by the decoder, and a value to be restored corresponding to each error value is stored in a table in advance, for example, and read from the table, thereby enabling restoration. If restoration in the decoder is performed by using such median values of all possible numbers in the range of errors that are not encoded in the encoder, the number of the low order bits that would not have been encoded, determined by a second threshold, may actually be increased from 2 bits, and therefore the number of high order bits that would have been encoded and ultimately decoded, again determined by the second threshold, may be further decreased by 1 bit.

In this manner, by calculating the second thresholds with the difference values of adjacent pixels for the first through third pixels and the fifth through tenth pixels illustrated in FIG. 9A, for example, the bits above the solid lines illustrated in FIG. 9B can be determined as the ranges to be encoded and ultimately received and decoded by a decoder embodiment. Since the embodiments illustrated in FIGS. 9A and 9B assume that the second value is preset as '16', only the 3 high order bits can be determined as a range to be encoded, for example.

Figure 4:
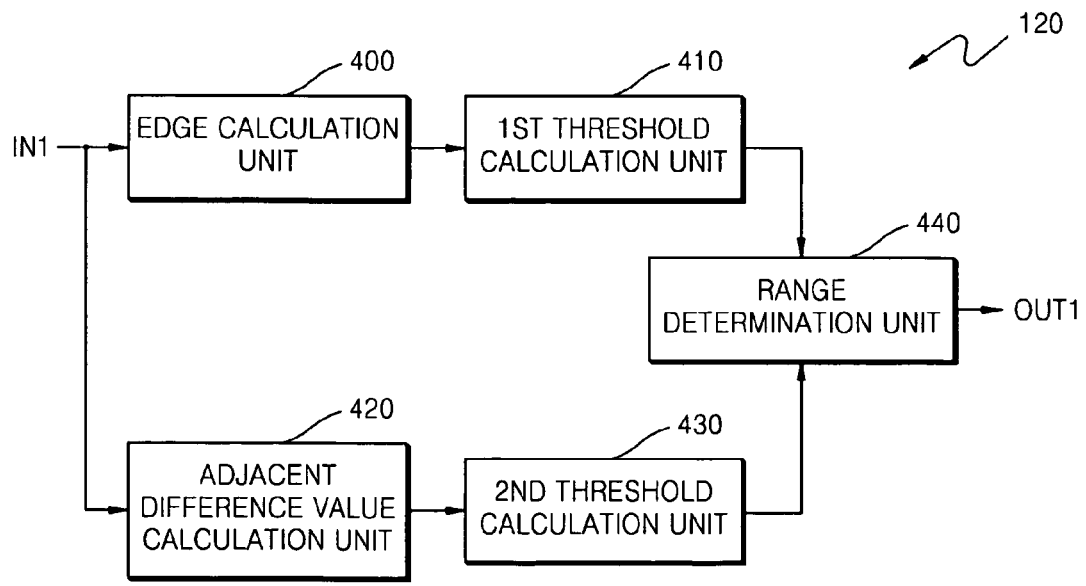
FIG. 4 illustrates an encoding range determination unit to determine a range to be encoded of an error calculated in an error calculation unit by using an edge of a predetermined pixel or a difference value of adjacent pixels disposed adjacent to the predetermined pixel, according to an embodiment of the present invention.

FIG. 4 illustrates an encoding range determination unit to determine a range to be encoded of a calculated error, such as calculated in the error calculation unit 110, by using an edge of a predetermined pixel or the difference value of adjacent pixels disposed adjacent to the predetermined pixel, according to an embodiment of the present invention. The encoding range determination unit 120 may include an edge calculation unit 400, a first threshold calculation unit 410, an adjacent value calculation unit 420, a second threshold calculation unit 430, and a range determination unit 440, for example.

The edge calculation unit 400 may calculate an edge of each pixel. Herein, an edge means a difference value between the value of a predetermined pixel and the value of an adjacent pixel disposed adjacent to the predetermined pixel. Referring to FIG. 7, for example, an edge of an n-th pixel is the difference value between an (n−1)-th pixel and the n-th pixel, and corresponds to an interval indicated by a reference number 700.

The first threshold calculation unit 410 may calculate a first threshold by dividing an edge of each pixel calculated in the edge calculation unit 400 by a preset first value.

The adjacent difference value calculation unit 420 may further calculate the difference value between adjacent pixels disposed adjacent to each pixel. Referring to FIG. 8, for example, the difference value between the adjacent pixels of an n-th pixel means the difference value between an (n−1)-th pixel and an (n+1)-th pixel disposed adjacent to the n-th pixel, and corresponds to the interval indicated by a reference number 800.

The second threshold calculation unit 430 may then calculate a second threshold, by dividing the difference value between adjacent pixels of each pixel calculated in the adjacent difference value calculation unit 420 by a preset second value.

In this case, the preset second value may be different from the preset first value described above with reference to FIG. 2, for example. The difference value between adjacent pixels disposed adjacent to a predetermined pixel corresponds to a value equal to or greater than a value obtained by multiplying a maximum difference value between the predetermined pixel and an adjacent pixel by '2', for example. Such a relationship will now be explained with further reference to FIG. 8. In this example, adjacent pixels to the n-th pixel include the (n−1)-th pixel and the (n+1)-th pixel. A first edge, which is the difference value between the n-th pixel and the (n−1)-th pixel which is one of adjacent pixels of the n-th pixel, is a value corresponding to a reference number 810. A second edge, which is the difference value between the n-th pixel and the (n+1)-th pixel which is one of the other adjacent pixels of the n-th pixel, is a value corresponding to a reference number 820. This relationship can be expressed by the below Equation 2, for example.

$$\max(edge1, edge2) \geq neighbor/2 \qquad \text{Equation 2:}$$

Here, "edge1" is the first edge and "edge2" is the second edge, and "neighbor" is the difference value between adjacent pixels.

Since edges and the difference value between adjacent pixels may have the relationship as shown in Equation 2, it may be assumed that an edge is the same as the difference value between adjacent pixels, and a value obtained by dividing a first value by '2' can be preset as a second value, for example.

The range determination unit 440 may, thus, select the larger threshold of the calculated first threshold, e.g., as calculated in the first threshold calculation unit 410, and the calculated second threshold, e.g., as calculated in the second threshold calculation unit 430, and by using the larger threshold, for example, the range determination unit 440 may then set the range of the calculated error to be encoded from among bits of the error calculated in the error calculation unit 110. For example, if the first threshold is greater than the second threshold, the range determination unit 440 may set the range of the calculated error to be encoded in a similar manner as performed in the range determination unit 220 of FIG. 2. As another example, if the second threshold is greater than the first threshold, the range determination unit 440 may set the range of the calculated error to be encoded in a similar manner as performed in the range determination unit 320 illustrated in FIG. 3.

FIGS. 9A and 9B again illustrate example tables that may be used in embodiments for determining a range in the range determination unit 440. FIG. 9A is a table illustrating edges of first through tenth pixels and difference values of adjacent pixels of the first through tenth pixels, according to an embodiment of the present invention, and FIG. 9B is a table expressing errors of the first through tenth pixels in units of bit-planes in an order from high order bits to low order bits, again according to an embodiment of the present invention. Here, since adjacent pixels are generally used in the prediction unit 100 in order to predict a reference pixel, it may be assumed in the embodiments illustrated in FIGS. 9A and 9B that an edge is the same as an error, for example.

Referring to FIG. 9B, the first thresholds calculated in the first threshold unit 410 are indicated by dotted lines, and the second thresholds calculated in the second threshold are indicated by solid lines. Here, the range determination unit 440 may determine the larger value of the dotted lines and the solid lines as a threshold, and determine the bit-plane of error values disposed above the determined threshold as a range to be encoded.

Referring again to FIG. 1, the encoding unit 130 may encode only a portion of the calculated error, such as calculated in the error calculation unit 110, corresponding to the range determined in the encoding range determination unit 120, for example. More specifically, the encoding unit 130 may, thus, encode the high order bits of the calculated error, as determined to be encoded by the encoding range determination unit 120, thereby generating a bitstream and outputting the bitstream through an output terminal (OUT). In an embodiment, similarly, such an encoded higher order bits of the calculated error may be received and decoded by a decoder and a corresponding error restored by the decoder, based on the same.

Figure 12:
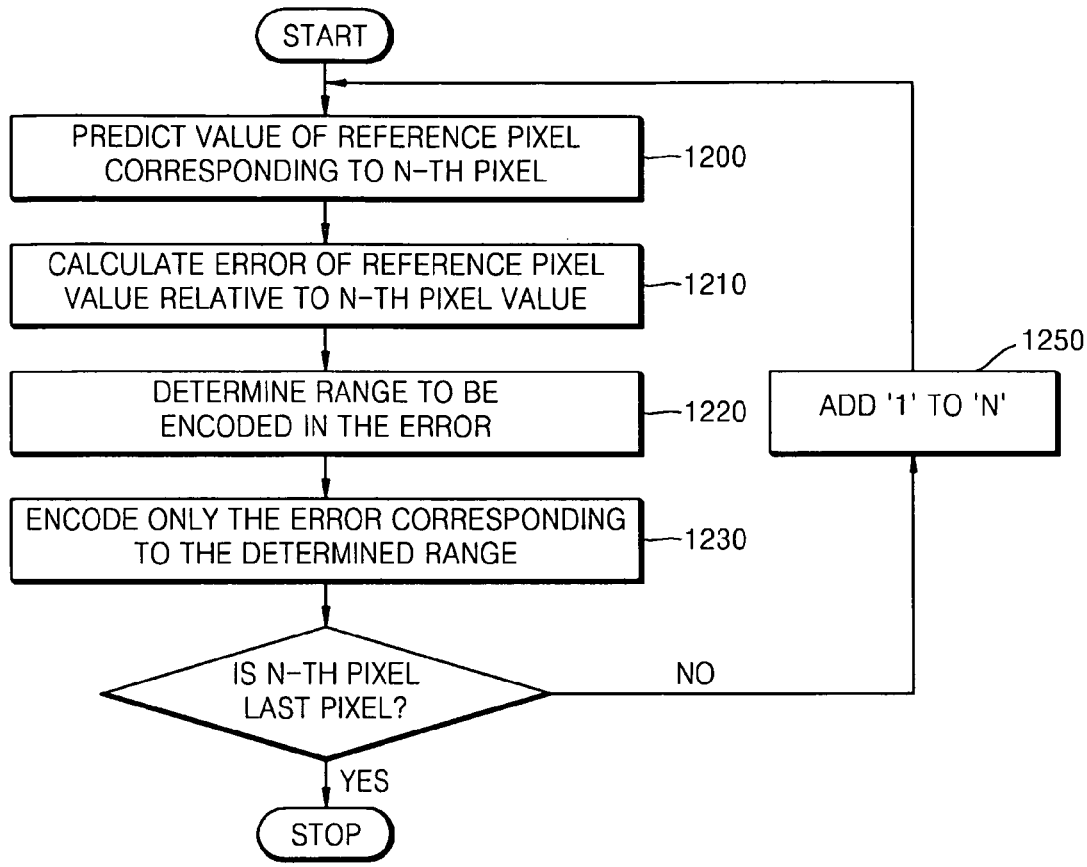
FIG. 12 illustrates a method of encoding an image by using psycho-visual characteristics, according to an embodiment of the present invention.

FIG. 12 illustrates a method of encoding an image based on psycho-visual characteristics, according to an embodiment of the present invention.

First, pixels forming an image may be input and a value of a reference pixel corresponding to an n-th pixel predicted, according to a preset method, in operation 1200. As only an example, FIG. 10 illustrates an example of the prediction of a value of a predetermined pixel in operation 1200, according to an embodiment of the present invention. Referring to FIG. 10, the value of a predetermined pixel can be predicted by using the values of pixels disposed above, to the left of, and to the right of the predetermined pixel. In an embodiment, an edge detecting operation may be used to predict such a value in operation 1200. As an example, the edge detecting operation may be that discussed in "Two low cost algorithms for improved diagonal edge detection in JPEG-LS", IEEE Trans. On Consumer Electronics, Vol. 47, No. 3, 2001, pp 466-476, noting that alternatives are equally available.

An embodiment of predicting the value of a predetermined pixel 'x' by using an edge detecting method will now be further explained with reference to FIG. 11. An algorithm of an edge detecting operation for the pixel 'x' may be as follows:

```
if (c >= max(a,b)) P = min(a,b);
else{
    if (c <= min(a,b)) P = max(a,b);
    else P = a+b-c;
}
```

Here, 'P' is the value of the reference pixel corresponding to the pixel 'x', 'a' is the value of the pixel disposed to the left of the pixel 'x', 'b' is the value of the pixel above the pixel 'x', and 'c' is the value of the pixel above and to the left of the pixel 'x'.

According to this example algorithm, the value of the reference pixel 'P' is determined according to whether an edge is in the horizontal direction or in the vertical direction, and which is the greater of 'a' and 'b'. Here, for example, if it is assumed that the greater value of 'a' and 'b' is equal to or greater than 'c', when the smaller value of 'a' and 'b' is 'a', the pixel 'x' may be considered to have an edge in the horizontal direction, and the value 'P' of the reference pixel may be determined to be 'a'. In this case, when the smaller value of 'a' and 'b' is 'b', the pixel 'x' may be considered to have an edge in the vertical direction, and the value 'P' of the reference pixel may be determined to be 'b'. Meanwhile, if it is assumed that the smaller value of 'a' and 'b' is equal to or greater than 'c', when the greater value of 'a' and 'b' is 'a', the pixel 'x' may be considered to have an edge in the horizontal direction, and the value 'P' of the reference pixel may be determined to be 'a'. In this case, when the greater value of 'a' and 'b' is 'b', the pixel 'x' may be considered to have an edge in the vertical direction, and the value 'P' of the reference pixel may be determined to be 'b'. Still further, if it is assumed that 'c' is greater than the smaller value of 'a' and 'b', and smaller than the greater value of 'a' and 'b', it may be difficult to determine the direction of an edge, and the value 'P' of the reference pixel may, thus, be determined to be a value obtained by adding 'a' and 'b' and then, subtracting 'c' from the addition result, by considering all 'a', 'b', and 'c', noting that alternatives are equally available.

Referring to FIG. 12, an error between the value of a predicted reference pixel, e.g., predicted corresponding to an n-th pixel in operation 1200, and a known actual value of the n-th pixel may be calculated in operation 1210, for example.

An ultimate range of the calculated error to actually be encoded, rather than the full calculated error, for example, may be determined in operation 1220. The range determined in operation 1220 may be accomplished by a preset method capable of determining an encoding range that would be recognized based on human psycho-visual characteristics. The recognition aspect is based upon whether one would recognize a change in the ultimate encoded value from a full encoded value, or whether the change in the encoded value is small enough to not be recognized. In other words, in the error calculated in operation 1210, changes in values corresponding to high order bits that would be recognized according to human psycho-visual characteristics are distinguished from changes in values corresponding to low order bits that would not be recognized according to psycho-visual characteristics.

Below, embodiments of the encoding range determination of operation 1220 will be further discussed with reference to FIGS. 13, 14 and 15, as only examples.

Figure 13:
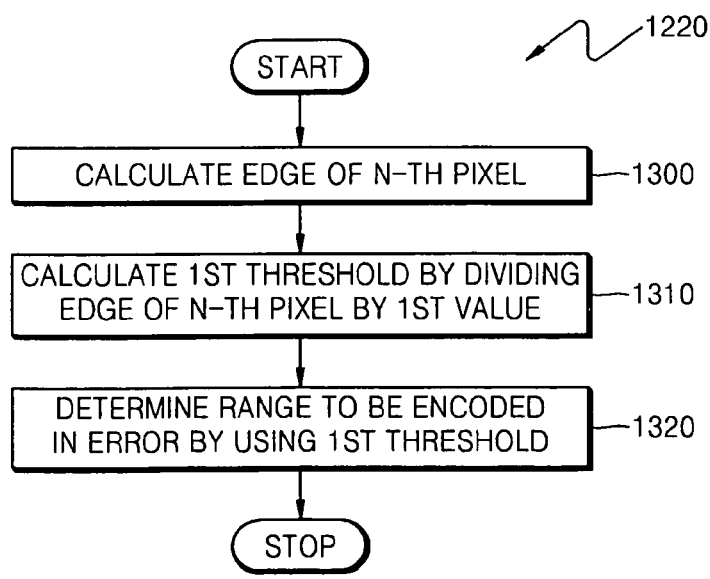
FIG. 13 illustrates a method of determining a range of error to be encoded of a calculated error of an n-th pixel, by using an edge of the n-th pixel, according to an embodiment of the present invention.

FIG. 13 illustrates a method of determining a range to be encoded of the error of the n-th pixel calculated in operation 1210, for example, by using an edge of the n-th pixel, according to an embodiment of the present invention.

First, an edge of the n-th pixel may be calculated in operation 1300. Herein, an edge means a difference value between the value of a predetermined pixel and the value of an adjacent pixel disposed adjacent to the predetermined pixel. Referring to FIG. 7, for example, an edge of an n-th pixel is the difference value between an (n−1)-th pixel and the n-th pixel, and corresponds to an interval indicated by a reference number 700.

A first threshold may be calculated by dividing the edge of the n-th pixel, e.g., as calculated in operation 1300, by a preset first value, in operation 1310.

A range to be encoded of the error of the n-th pixel, e.g., as calculated in operation 1210, may be then set by using the first threshold calculated in operation 1310, in operation 1320. Two example embodiments in which a range to be encoded of the error by using the first threshold is determined in operation 1320 will now be further explained.

First, in this example, values of an error that do not fall within the first threshold, from among the values of the error calculated in operation 1210, may be set to be included in the range to be encoded. Referring to FIG. 5A, for example, an interval corresponding to a reference number 500 may be calculated as an edge of an n-th pixel in operation 1300. If '8' is preset as a value for division for a first threshold as in a graph illustrated in FIG. 6, the interval corresponding to the reference number 500 may be divided by '8', thereby calculating the first threshold in operation 1310. In operation 1320, a range corresponding to the reference number 510, permitting errors corresponding to the first threshold in relation to the n-th pixel value, is determined.

An example of the fourth pixel illustrated in FIG. 9A will now be explained, assuming that an edge for the fourth pixel is calculated as '25' in operation 1300. However, since adjacent pixels are generally used in order to predict a reference pixel in operation 1200, it will be assumed in the embodiments illustrated in FIGS. 9A and 9B that an edge is the same as an error. In operation 1310, '25', the edge of the fourth pixel, may be divided by '8', as the preset first value, thereby obtaining a first threshold of '3.125'. In operation 1320, the 2 low order bits of the calculated error, corresponding to a value equal to or less than the first threshold of '3.125', are determined to be the range not to be encoded, and the 3 high order bits of the calculated error, corresponding to a value equal to or greater than the first threshold of '3.125', are determined to be the range to be encoded. According to this example, in operation 1320, only the 3 high order bits '110' from the entire '11001' (corresponding to '25' which is the error of the fourth pixel) are determined to be the range to be encoded, with the 2 low order bits '01' being determined to be the range of the entire '11001' not encoded.

Secondly, the range to be encoded may be determined by considering a range not falling within the first threshold range of the error calculated in operation 1210, and an algorithm for restoring error values not encoded in an encoder, in a decoding operation. Thus, in this embodiment, the error values not encoded by the encoder may be restored by a corresponding algorithm preset in a decoding operation. In this case, as an example of the preset algorithm, expected values, mean values, and median values of all possible values in the range of error values not encoded in the encoder can be restored in the decoding operation, and a value to be restored corresponding to each error value may be stored in a table in advance, for example, and can be read from the table during decoding, thereby enabling restoration by the decoder. In such a decoding embodiment, if such restoration by the decoder is performed by using median values of all possible numbers in the range of errors that are not encoded in the encoder, the number of low order bits not to be encoded, which is determined by a first threshold, may be further increased by 1 bit, and therefore the number of high order bits to be encoded, which is determined by the first threshold, may actually be decreased by 1 bit.

For example, in the case of the fourth pixel illustrated in FIG. 9A, which is the example explained in the first example method, with reference to first threshold of '3.125', the 2 low order bits corresponding to a value equal to or less than the first threshold of '3.125' are determined to be the range not to be encoded, and the 3 high order bits corresponding to a value equal to or greater than the first threshold of '3.125' are determined to be the range to be encoded in operation 1320. Accordingly, in operation 1320, only the 3 high order bits '110' from the entire '11001' (corresponding to '25' which is the error of the fourth pixel) are determined to be the range to be encoded, and the 2 low order bits '01' of the entire '11001' are determined to be the range not to be encoded.

However, in an embodiment, if restoration in a decoding embodiment is performed according to the second example method by using median values of all possible numbers in the range of errors that are not encoded in such an encoding operation, only the '11', which is the 2 high order bits, may have been encoded, without further encoding the 1 bit of the high order bits, with the 3 low order bits not having been encoded. Also in this case, the decoding operation may restore the 3 low order bits as '100', which is the median value of '000' through '111' that can be expressed by the 3 low order bits that are not transmitted by the encoder. These 3 restored low order bits may then be synthesized with '11', which is the 2 high order bits transmitted by the encoding end, and '11100' finally restored. Here, in this example, the restored '11100' would differ only by '11' in comparison to '11001' which is the error of the fourth pixel, and therefore would be within the first threshold range. Accordingly, although a range encoding 1 bit less may be determined from among the high order bits determined according to the first threshold, a value of a pixel corresponding to within the threshold range can be restored in the decoding operation, while the result still not being recognized according to human psycho-visual characteristics, i.e., though less bits are actually encoded the difference between the restored value and fully encoded valued is low enough to be unrecognizable.

In a similar manner, by calculating the first thresholds with edges for the first through third pixels and the fifth through tenth pixels illustrated in FIG. 9A, for example, the bits above the dotted lines illustrated in FIG. 9B may be set as the ranges to be encoded and ultimately decoded by a decoder embodiment. Since the example embodiments illustrated in FIGS. 9A and 9B assume that the preset first value is '8', only the 2 high order bits have been determined as a range to be encoded, noting that alternatives are equally available.

In other words, for example, if it is assumed that an edge of a predetermined pixel is the same as an error of a reference pixel and a preset value for division for a first threshold is '8', the aforementioned first method would set only the 3 high order bits of the calculated error as a range to be encoded, and according to the aforementioned second method, if an algorithm by which a median value for low order bits not encoded in an encoder is added when restoration in a decoder is performed, is employed, only the 2 high order bits of the calculated error are needed to be set as the range to be encoded. However, as noted, the preset value is not limited to '8' and according to an execution environment such as the characteristic of a display, for example, a different value can also be preset and executed.

Figure 14:
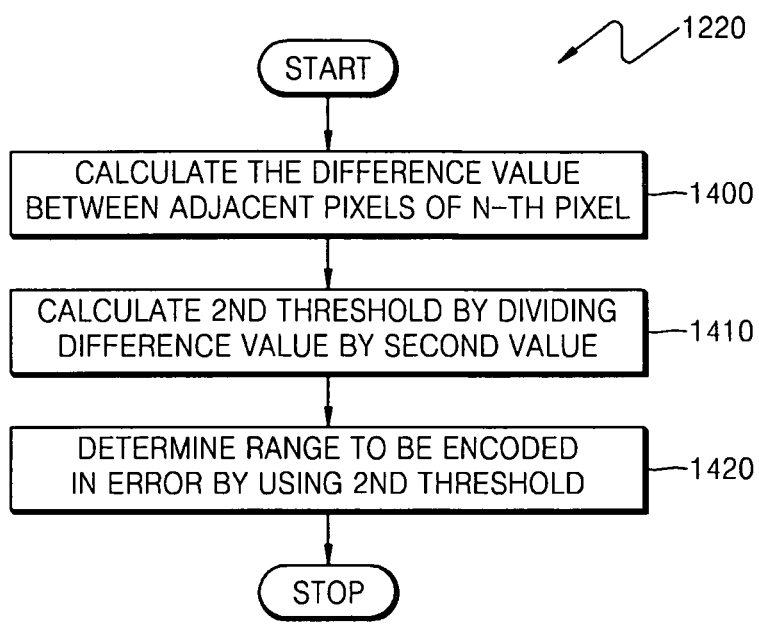
FIG. 14 illustrates a method of determining a range of error to be encoded of a calculated error of an n-th pixel, by using adjacent pixels disposed adjacent to the n-th pixel, according to an embodiment of the present invention.

FIG. 14 illustrates a method of determining a range of error values to be encoded from among a calculated error, for example, by using adjacent pixels disposed adjacent to the n-th pixel, according to an embodiment of the present invention.

First, a difference value between adjacent pixels disposed adjacent to the n-th pixel may be obtained in operation 1400. Referring to FIG. 8, for example, the difference value between the adjacent pixels of an n-th pixel means the difference value between an (n−1)-th pixel and an (n+1)-th pixel disposed adjacent to the n-th pixel, and corresponds to the interval indicated by a reference number 800.

A second threshold may, thus, be calculated by dividing the difference value between adjacent pixels of each pixel calculated in operation 1400 by a preset second value in operation 1410.

In this case, the preset second value may be different from the preset first value described above with reference to FIG. 13. The difference value between adjacent pixels disposed adjacent to a predetermined pixel corresponds to a value equal to or greater than a value obtained by multiplying a maximum difference value between the predetermined pixel and an adjacent pixel by '2', for example. Such a relationship will now be explained with further reference to FIG. 8. In this example, adjacent pixels to the n-th pixel include the (n−1)-th pixel and the (n+1)-th pixel. A first edge, which is the difference value between the n-th pixel and the (n−1)-th pixel, as one of adjacent pixels of the n-th pixel, is a value corresponding to a reference number 810. A second edge, which is the difference value between the n-th pixel and the (n+1)-th pixel, as one of the other adjacent pixels of the n-th pixel, is a value corresponding to a reference number 820. This relationship may be expressed by the below Equation 3, for example.

$$\max(edge1, edge2) \geq neighbor/2 \qquad \text{Equation 3:}$$

Here, "edge1" is the first edge and "edge2" is the second edge, and "neighbor" is the difference value between adjacent pixels.

Since edges and the difference value between adjacent pixels have the relationship as shown in Equation 3, in this embodiment, it will be assumed that an edge is the same as the difference value between adjacent pixels, and a value obtained by dividing a first value by '2' can be preset as a second value, for example.

A range to be encoded in the error calculated in operation 1210 may further be determined by using the second threshold calculated in operation 1410 in operation 1420. Two example embodiments, in which a range to be encoded in the error is determined by using the second threshold, will now be explained.

First, values of a calculated error, such as calculated in operation 1410, and which do not fall within the second threshold are determined to be included in a range to be encoded. Referring to FIG. 5B, for example, an interval indicated by a reference number 520, which is the difference value between an (n−1)-th pixel and an (n+1)-th pixel adjacent to an n-th pixel, is calculated in operation 1400. If '16' is preset as the second value for division for a second threshold, the second threshold may be calculated by dividing the interval corresponding to the reference number 520 by '16' in operation 1410. Errors that fall outside the second threshold range relative to the value of the n-th pixel may then be permitted to be encoded, in operation 1420.

According to an embodiment, an example of the fourth pixel illustrated in FIG. 9A will now be explained, assuming that the difference value between adjacent pixels of the fourth pixel is calculated as '46' in operation 1400, for example. Here, since adjacent pixels are generally used in order to predict a reference pixel in operation 1200, it may be assumed in the embodiments illustrated in FIGS. 9A and 9B that an edge is the same as an error. In operation 1410, '45', the difference value of adjacent pixels of the fourth pixel, may then be divided by '16', thereby setting a second threshold to '2.875'. In operation 1420, the 2 low order bits corresponding to a value equal to or less than the second threshold of '2.875' is determined as a range not to be encoded, and the 3 high order bits corresponding to a value equal to or greater than the second threshold of '2.875' is determined to be a range to be encoded. According to this, only the 3 high order bits '110' from the entire '11001' (corresponding to '25' which is the error of the fourth pixel) are determined to be a range to be encoded, and the 2 low order bits '01' of the entire '11001' are determined to be the range not to be encoded.

Secondly, in an embodiment, the range to be encoded may be determined by considering the range of such a calculated error not falling within in a second threshold range, and an algorithm for restoring such non-encoded error values in a decoding operation. In this embodiment, the error values not encoded by such an encoder may, thus, be restored by an algorithm preset in the decoding operation. In this case, as an example of the preset algorithm, expected values, mean values, and median values of all possible values in the range of error values not encoded in the encoder may be restored by the decoding operation, and a value to be restored corresponding to each error value is stored in a table in advance, for example, and can be read from the table, thereby enabling restoration. If restoration in the decoding operation is performed by using such median values of all possible numbers in the range of errors that are not encoded in the encoder, the number of the low order bits that would not have been encoded, determined by a second threshold, may actually be increased from 2 bits, and therefore the number of high order bits that would have been encoded and ultimately decoded, again determined by the second threshold, can be further decreased by 1 bit.

In this manner, by calculating the second thresholds with the difference values of adjacent pixels for the first through third pixels and the fifth through tenth pixels illustrated in FIG. 9A, for example, the bits above the solid lines illustrated in FIG. 9B can be determined as the ranges to be encoded and ultimately received and decoded in a decoding embodiment. Since the embodiments illustrated in FIGS. 9A and 9B assume that the second value is preset as '16', only the 3 high order bits can be determined as a range to be encoded, for example.

Figure 15:
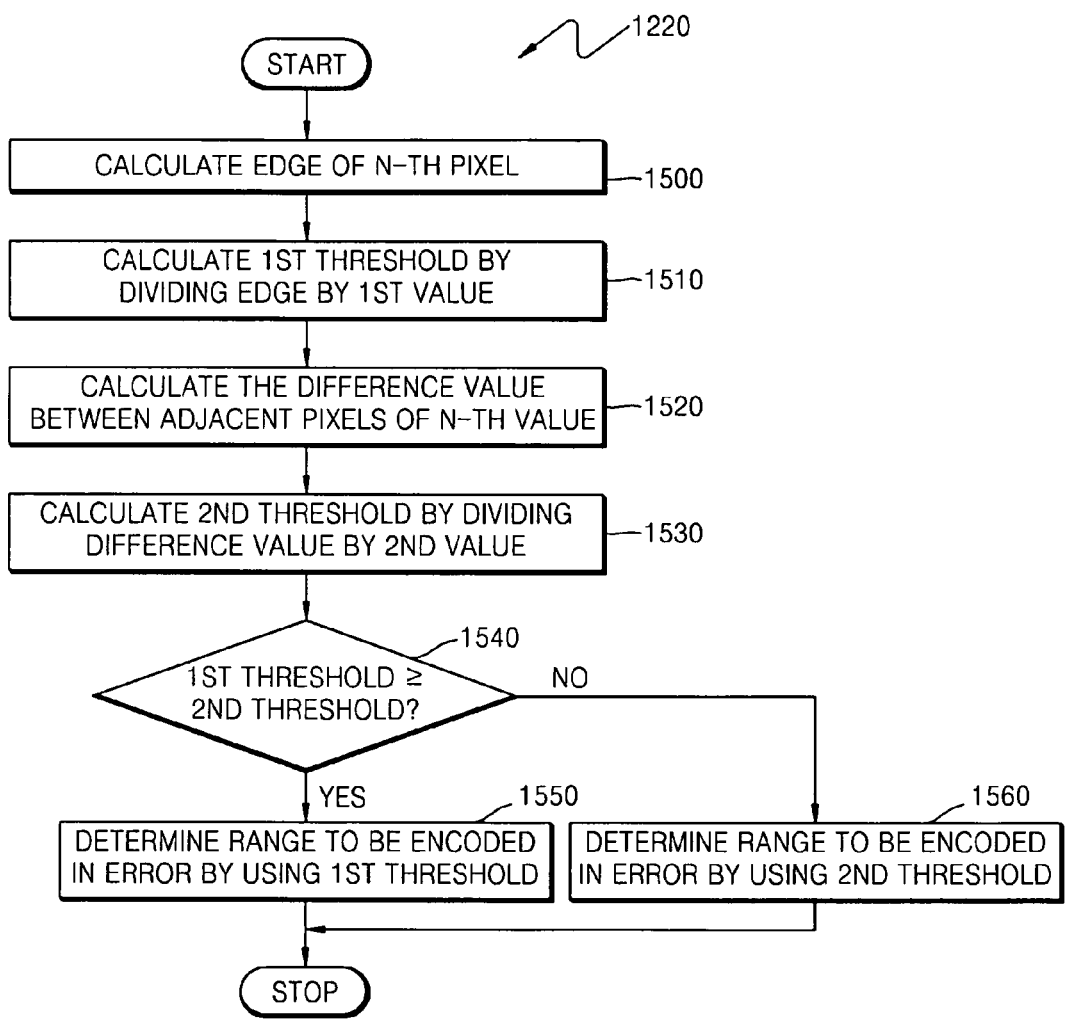
FIG. 15 illustrates a method of determining a range of error to be encoded of a calculated error of an n-th pixel, by using an edge of the n-th pixel or a difference value of adjacent pixels disposed adjacent to the n-th pixel, according to an embodiment of the present invention.

FIG. 15 illustrates a method of determining a range to be encoded of a calculated error of an n-th pixel, for example, by using an edge of the n-th pixel or the difference value of adjacent pixels disposed adjacent to the n-th pixel, according to an embodiment of the present invention.

First, an edge of the n-th pixel may be calculated in operation 1500. Herein, an edge means a difference value between the value of a predetermined pixel and the value of an adjacent pixel disposed adjacent to the predetermined pixel. Referring to FIG. 7, for example, an edge of an n-th pixel is the difference value between an (n−1)-th pixel and the n-th pixel, and corresponds to an interval indicated by a reference number 700.

A first threshold may be calculated by dividing an edge of each pixel calculated in operation 1500 by a preset first value in operation 1510.

The difference value between adjacent pixels disposed adjacent to each pixel may further be calculated in operation 1520. Referring to FIG. 8, for example, the difference value between the adjacent pixels of an n-th pixel means the difference value between an (n−1)-th pixel and an (n+1)-th pixel disposed adjacent to the n-th pixel, and corresponds to the interval indicated by a reference number 800.

A second threshold may be calculated by dividing the difference value between adjacent pixels of each pixel calculated in operation 1520 by a preset second value in operation 1530.

In this case, the preset second value may be different from the preset first value described above with reference to FIG. 13, for example. The difference value between adjacent pixels disposed adjacent to a predetermined pixel corresponds to a value equal to or greater than a value obtained by multiplying a maximum difference value between the predetermined pixel and an adjacent pixel by '2', for example. This relationship will now be explained with further reference to FIG. 8. In this example, adjacent pixels to the n-th pixel include the (n−1)-th pixel and the (n+1)-th pixel. A first edge, which is the difference value between the n-th pixel and the (n−1)-th pixel which is one of adjacent pixels of the n-th pixel, is a value corresponding to a reference number 810. A second edge, which is the difference value between the n-th pixel and the (n+1)-th pixel which is one of the other adjacent pixels of the n-th pixel, is a value corresponding to a reference number 820. This relationship can be expressed by the below Equation 4, for example.

$$\max(\text{edge1}, \text{edge2}) \geq \text{neighbor}/2 \quad \text{Equation 4:}$$

Here, "edge1" is the first edge and "edge2" is the second edge, and "neighbor" is the difference value between adjacent pixels.

Since edges and the difference value between adjacent pixels have the relationship as shown in Equation 4, it may be assumed that an edge is the same as the difference value between adjacent pixels, and a value obtained by dividing a first value by '2' can be preset as a second value, for example.

It may further be determined which is the larger threshold of the first threshold calculated in operation 1510 and the second threshold calculated in operation 1530 in operation 1540.

If it is determined in operation 1540 that the first threshold is greater than the second threshold, a range to be encoded of the error calculated in operation 1210 may be determined by using the first threshold calculated in operation 1510 in operation 1550. Operation 1550 may further be performed in a similar manner as operation 1320 illustrated in FIG. 13, for example.

If it is determined in operation 1540 that the second threshold is greater than the first threshold, a range to be encoded of the error calculated in operation 1210 may be determined by using the second threshold calculated in operation 1530 in operation 1560. Operation 1560 may further be performed in a similar manner as operation 1420 illustrated in FIG. 14, for example.

FIGS. 9A and 9B again illustrate example tables that may be used in embodiments for determining a range in operations 1540 through 1560. FIG. 9A is a table illustrating edges of first through tenth pixels and difference values of adjacent pixels of the first through tenth pixels, according to an embodiment of the present invention, and FIG. 9B is a table expressing errors of the first through tenth pixels in units of bit-planes in an order from high order bits to low order bits, again according to an embodiment of the present invention. Here, since adjacent pixels are generally used in the prediction unit 100 in order to predict a reference pixel, it may be assumed in the embodiments illustrated in FIGS. 9A and 9B that an edge is the same as an error, for example.

In FIG. 9B, the first thresholds calculated in operation 1510 are indicated by dotted lines and the second thresholds calculated in operation 1530 are indicated by solid lines. In operations 1540 through 1560, the larger value of the dotted lines and the solid lines may be determined as a threshold, and the bit-plane of errors disposed above the determined threshold is determined as a range to be encoded.

Referring again to FIG. 12, in an embodiment, only the error of the n-th pixel calculated in operation 1230 corresponding to the range determined in operation 1220 is encoded in operation 1230. More specifically, in this example, only the high order bits of the error calculated in operation 1210, as determined to be encoded in operation 1220, is encoded in operation 1230.

After operation 1230, it may be determined whether the n-th pixel is the last pixel to be encoded in operation 1240.

If it is determined that the n-th pixel is not the last pixel to be encoded, 'n' is increased by '1' and operations 1200 through 1230 may be repeatedly performed In a similar manner, such encoded higher bits of the calculated error may be received and decoded in a decoding embodiment and a corresponding error restored based on the same.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or controlling carrier waves as well as elements of the Internet, for example. Thus, the medium may be such a defined and measurable structure carrying or controlling a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of encoding an image based on psycho-visual characteristics, the method comprising:

calculating an error between a value of an input predetermined pixel, of a plurality of pixels forming an image, and a predicted value of a reference pixel corresponding to the predetermined pixel;

calculating a difference value between two or more pixels among the plurality of pixels forming the image;

calculating a threshold value by dividing the calculated difference value by a preset value;

determining a range of the calculated error to be encoded according to a preset operation determining the range, the preset operation determining the range based on a psycho-visual characteristic based recognition of portions of the calculated error selected to be excluded during encoding, wherein the determining of the range comprises selecting a number of most significant bits of the calculated error which correspond to a value equal to or greater than the calculated threshold; and encoding the calculated error using only the determined range, by encoding only the selected number of most significant bits for the encoding of the calculated error.

2. The method of claim 1, wherein the calculating the difference value comprises:

calculating a difference value between the value of the predetermined pixel and a value of an adjacent pixel disposed adjacent to the predetermined pixel.

3. The method of claim 1, wherein the calculating the difference value comprises:
calculating a difference value between adjacent pixels disposed adjacent to the predetermined pixel.

4. At least one non-transitory computer readable medium comprising computer readable code to control at least one processing element to implement the method of claim 1.

5. The method of claim 1, wherein, when the portions of the calculated error are selected to be excluded, the portions of the calculated error that are selected to be excluded include at least a lowest order bit of the calculated error for the encoding of the calculated error.

6. A method of decoding an image encoded based on psycho-visual characteristics, the encoded image including encoded calculated error between a value of an input predetermined pixel, of a plurality of pixels forming the image, and a predicted value of a reference pixel corresponding to the predetermined pixel, with the encoded calculated error including a select range of a calculated error calculated by an encoder that generated the encoded calculated error, and with the range of the encoded calculated error being based on a psycho-visual characteristic based recognition of portions of the calculated error excluded during encoding, the decoding method comprising:
receiving the encoded calculated error; and
restoring a value corresponding to the unencoded calculated error by synthesizing a remainder of the encoded calculated error and combining the synthesized remainder with the received encoded calculated error,
wherein the select range of the calculated error is determined by:
calculating a difference value between two or more pixels among the plurality of pixels forming the image;
calculating a threshold value by dividing the calculated difference value by a preset value; and
selecting a number of most significant bits of the calculated error which correspond to a value equal to or greater than the calculated threshold.

7. The method of claim 6, wherein the synthesized remainder of the encoded calculated error is generated based on any one of an expected value, a mean value, and a median value operation.

8. At least one non-transitory computer readable medium comprising computer readable code to control at least one processing element to implement the method of claim 6.

9. The method of claim 6, wherein, when the portions of the calculated error are excluded by the encoder, the portions of the calculated error excluded during encoding include at least a lowest order bit of the calculated error for the encoding of the calculated error.

10. An apparatus encoding an image based on psycho-visual characteristics, the apparatus comprising:
an error calculation unit to calculate an error between a value of an input predetermined pixel, of a plurality of pixels forming an image, and a predicted value of a reference pixel corresponding to the predetermined pixel;
an encoding range determination unit to determine a range of the calculated error to be encoded according to a preset operation determining the range, the preset operation determining the range based on a psycho-visual characteristic based recognition of portions of the calculated error selected to be excluded during encoding, wherein the encoding range determination unit further comprises:
a calculation unit to calculate a difference value between two or more pixels among the plurality of pixels forming the image;
a threshold calculation unit to calculate a threshold value by dividing the calculated difference value by a preset value; and
a range determination unit to determine the range by selecting a number of most significant bits of the calculated error which correspond to a value equal to or greater than the calculated threshold; and
an encoding unit to encode the calculated error using only the determined range by encoding only the selected number of most significant bits for the encoding of the calculated error.

11. The apparatus of claim 10, wherein the calculation unit includes an edge calculation unit calculate the difference value by calculating a difference value between the value of the predetermined pixel and a value of an adjacent pixel disposed adjacent to the predetermined pixel.

12. The apparatus of claim 10, wherein the calculation unit includes an adjacent difference value calculation unit to calculate the difference value by calculating a difference value between adjacent pixels disposed adjacent to the predetermined pixel.

13. The apparatus of claim 10, wherein, when the portions of the calculated error are selected to be excluded, the portions of the calculated error that are selected to be excluded include at least a lowest order bit of the calculated error for the encoding of the calculated error.

* * * * *